(12) United States Patent
Eyer (10) Patent No.: US 9,723,360 B2
(45) Date of Patent: Aug. 1, 2017

(54) INTERESTS AND DEMOGRAPHICS PROFILE FOR ADVANCED BROADCAST SERVICES

(75) Inventor: Mark Eyer, Woodinville, WA (US)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 12/942,835

(22) Filed: Nov. 9, 2010

(65) Prior Publication Data

US 2011/0246488 A1    Oct. 6, 2011

Related U.S. Application Data

(60) Provisional application No. 61/319,873, filed on Apr. 1, 2010.

(51) Int. Cl.
```
G06F 7/00        (2006.01)
G06F 17/30       (2006.01)
H04N 21/442      (2011.01)
G06Q 30/02       (2012.01)
H04N 21/475      (2011.01)
```

(52) U.S. Cl.
CPC ..... *H04N 21/442* (2013.01); *G06F 17/30867* (2013.01); *G06Q 30/02* (2013.01); *H04N 21/4758* (2013.01)

(58) Field of Classification Search
None
See application file for complete search history.

(56) References Cited

U.S. PATENT DOCUMENTS

| | | | | |
|---|---|---|---|---|
| 5,915,243 A | * | 6/1999 | Smolen | 705/14.19 |
| 6,115,737 A | * | 9/2000 | Ely et al. | 709/203 |
| 6,160,570 A | * | 12/2000 | Sitnik | 725/9 |
| 6,850,252 B1 | | 2/2005 | Hoffberg | |
| 7,030,890 B1 | * | 4/2006 | Jouet et al. | 345/619 |
| 7,051,064 B1 | | 5/2006 | Yamagishi et al. | |
| 7,093,000 B1 | | 8/2006 | Yamagishi et al. | |
| 7,328,402 B1 | | 2/2008 | Yamagishi et al. | |

(Continued)

FOREIGN PATENT DOCUMENTS

| | | |
|---|---|---|
| CN | 1343334 | 4/2002 |
| CN | 1343334 A | 4/2002 |

(Continued)

OTHER PUBLICATIONS

"International Search Report and Written Opinion of the International Searching Authority Dated Apr. 4, 2011", International Application No. PCT/US11/23629.

(Continued)

*Primary Examiner* — Usmaan Saeed
*Assistant Examiner* — Yu Zhao
(74) *Attorney, Agent, or Firm* — Oblon, McClelland, Maier & Neustadt, L.L.P.

(57) ABSTRACT

A digital broadcast receiver has a storage device and a processing device. The storage device is configured to store a questionnaire received from at least one service provider of a digital broadcast system, and answers to the questionnaire. The questionnaire comprises a data structure common to at least two service providers. The processing device is configured to manipulate the questionnaire and answers. The questionnaire pertains to viewer preferences, demographics, and interests (PDI) information.

36 Claims, 11 Drawing Sheets

(56) References Cited

U.S. PATENT DOCUMENTS

| | | | |
|---|---|---|---|
| 7,363,307 | B1 | 4/2008 | Yamagishi et al. |
| 7,706,740 | B2 | 4/2010 | Collins et al. |
| 8,099,752 | B2 | 1/2012 | Eyer |
| 8,285,196 | B2 | 10/2012 | Rao |
| 2002/0019769 | A1 | 2/2002 | Barritz et al. |
| 2002/0032905 | A1 | 3/2002 | Sherr et al. |
| 2002/0069403 | A1* | 6/2002 | Itoh et al. ............ 725/9 |
| 2002/0077880 | A1 | 6/2002 | Gordon et al. |
| 2002/0095431 | A1* | 7/2002 | McGeorge et al. ......... 707/200 |
| 2002/0152458 | A1 | 10/2002 | Eyer et al. |
| 2003/0144899 | A1 | 7/2003 | Kokubo |
| 2003/0172381 | A1 | 9/2003 | Janevski |
| 2004/0255322 | A1 | 12/2004 | Meadows et al. |
| 2006/0015904 | A1 | 1/2006 | Marcus |
| 2006/0107195 | A1 | 5/2006 | Ramaswamy et al. |
| 2006/0206912 | A1 | 9/2006 | Klarfeld et al. |
| 2006/0259923 | A1* | 11/2006 | Chiu ............... 725/24 |
| 2007/0143238 | A1 | 6/2007 | Kochunni et al. |
| 2008/0090513 | A1 | 4/2008 | Collins et al. |
| 2008/0119133 | A1 | 5/2008 | Rao |
| 2008/0119134 | A1* | 5/2008 | Rao ............... 455/3.05 |
| 2008/0160490 | A1 | 7/2008 | Gomes et al. |
| 2009/0119234 | A1 | 5/2009 | Pinckney et al. |
| 2009/0144797 | A1* | 6/2009 | Wang et al. ............. 725/131 |
| 2009/0152349 | A1* | 6/2009 | Bonev et al. ............. 235/383 |
| 2009/0281392 | A1* | 11/2009 | Brown ............... 600/300 |
| 2009/0300143 | A1 | 12/2009 | Musa et al. |
| 2009/0320059 | A1 | 12/2009 | Bolyukh |
| 2010/0134701 | A1 | 6/2010 | Eyer |
| 2010/0251305 | A1 | 9/2010 | Kimble et al. |
| 2011/0075990 | A1 | 3/2011 | Eyer |
| 2011/0088075 | A1 | 4/2011 | Eyer |
| 2011/0161999 | A1* | 6/2011 | Klappert et al. ............. 725/25 |
| 2011/0243536 | A1 | 10/2011 | Eyer |
| 2011/0246488 | A1 | 10/2011 | Eyer |
| 2011/0247028 | A1 | 10/2011 | Eyer |
| 2011/0298981 | A1 | 12/2011 | Eyer |
| 2011/0299827 | A1 | 12/2011 | Eyer |
| 2011/0302599 | A1 | 12/2011 | Eyer |
| 2011/0302611 | A1 | 12/2011 | Eyer |
| 2011/0307920 | A1 | 12/2011 | Blanchard et al. |
| 2012/0044418 | A1 | 2/2012 | Eyer |
| 2012/0047531 | A1 | 2/2012 | Eyer |
| 2012/0050619 | A1 | 3/2012 | Kitazato et al. |
| 2012/0050620 | A1 | 3/2012 | Kitazato |
| 2012/0054214 | A1 | 3/2012 | Yamagishi et al. |
| 2012/0054235 | A1 | 3/2012 | Kitazato et al. |
| 2012/0054267 | A1 | 3/2012 | Yamagishi et al. |
| 2012/0054268 | A1 | 3/2012 | Yamagishi |
| 2012/0054783 | A1 | 3/2012 | Yamagishi |
| 2012/0054784 | A1 | 3/2012 | Kitazato et al. |
| 2012/0054816 | A1 | 3/2012 | Dewa |
| 2012/0060197 | A1 | 3/2012 | Kitahara et al. |
| 2012/0063508 | A1 | 3/2012 | Hattori et al. |
| 2012/0072965 | A1 | 3/2012 | Dewa |
| 2012/0081508 | A1 | 4/2012 | Kitazato |
| 2012/0081607 | A1 | 4/2012 | Kitazato |
| 2012/0082266 | A1 | 4/2012 | Kitazato et al. |
| 2012/0082440 | A1 | 4/2012 | Kitazato |
| 2012/0084802 | A1 | 4/2012 | Kitazato |
| 2012/0084824 | A1 | 4/2012 | Kitazato |
| 2012/0084829 | A1 | 4/2012 | Kitazato |
| 2012/0185888 | A1 | 7/2012 | Eyer et al. |
| 2012/0253826 | A1 | 10/2012 | Kitazato et al. |
| 2012/0274848 | A1 | 11/2012 | Kitahara et al. |
| 2012/0275764 | A1 | 11/2012 | Eyer |
| 2013/0024894 | A1 | 1/2013 | Eyer |
| 2013/0024897 | A1 | 1/2013 | Eyer |
| 2013/0031569 | A1 | 1/2013 | Kitazato et al. |
| 2013/0036440 | A1 | 2/2013 | Eyer |
| 2013/0055313 | A1 | 2/2013 | Eyer |

FOREIGN PATENT DOCUMENTS

| | | |
|---|---|---|
| CN | 1197369 C | 4/2005 |
| JP | 2003-216798 A | 7/2003 |
| KR | 10-2007-0042151 | 4/2007 |
| KR | 10-0824600 | 4/2008 |
| KR | 10-2009-0044506 | 5/2009 |
| KR | 10-2010-0001219 | 1/2010 |

OTHER PUBLICATIONS

Korean Office Action issued Jul. 24, 2013 in Patent Application No. 10-2013-7011623 with English Translation.
Korean Office Action issued Sep. 4, 2013 in Patent Application No. 10-2013-7015827 with English Translation.
Notice of Reasons for Preliminary Rejection issue Feb. 7, 2014 in Korean Patent Application No. 10-2013-7031477 (with English translation).
Notice of Reasons for Preliminary Rejection issue Jan. 23, 2014 in Korean Patent Application No. 10-2013-7028918 (with English translation).
Combined Chinese Office Action and Search Report issued Dec. 12, 2014 in Patent Application No. 201180015025.3 (with English language translation).
Second Office Action issued Mar. 10, 2015 submitted after the response of Dec. 11, 2014 in Chinese Patent Application No. 201180015323.2.
Third Office Action issued Jun. 26, 2015 submitted after the response of May 15, 2015 in Chinese Patent Application No. 201180015323.2.
Extended European Search Report issued Dec. 5, 2014 in European Patent Application No. 11763189.5.
Office Action issued Sep. 16, 2013 in Korean Patent Application No. 10-2013-7011623 (Dispatch No. 9-5-2013-0510123-79).
Office Action issued Jan. 20, 2014 in Korean Patent Application No. 10-2013-7011623 (Dispatch No. 9-5-2013-0887487-13).
Office Action issued Apr. 10, 2014 in Korean Patent Application No. 10-2013-7015827 (Dispatch No. 9-5-2014-0182694-01).
Office Action issued Oct. 30, 2013 in Korean Patent Application No. 10-2013-7015827(Dispatch No. 9-5-2013-0623735-17).
Office Action issued Aug. 14, 2014 in Korean Patent Application No. 10-2013-7028918 (Dispatch No. 9-5-2014-0483173-52).
Office Action issued Mar. 21, 2014 in Korean Patent Application No. 10-2013-7028918 (Dispatch No. 9-5-2014-0053085-13).
Office Action issued Sep. 25, 2014 in Korean Patent Application No. 10-2013-7031477 (Dispatch No. 9-5-2014-0593010-21).
Office Action issued Apr. 3, 2014 in Korean Patent Application No. 10-2013-7031477 (Dispatch No. 9-5-2014-0091875-56).
Office Action issued Jun. 25, 2013 in Korean Patent Application No. 10-2013-7001963 (Dispatch No. 9-5-2013-0284641-16).
Office Action issued Nov. 27, 2013 in Korean Patent Application No. 10-2013-7001963 (Dispatch No. 9-5-2013-0743007-89).
Office Action issued Aug. 10, 2012 in Korean Patent Application No. 10-2011-7007470 (Dispatch No. 9-5-2012-0336072-66).
Office Action issued Jan. 24, 2013 in Korean Patent Application No. 10-2011-7007470 (Dispatch No. 9-5-2012-0788494-43).
Office Action issued Jun. 19, 2013 in Korean Patent Application No. 10-2011-7003737 (Dispatch No. 9-5-2013-0354115-98).
Office Action issued Jan. 22, 2013 in Korean Patent Application No. 10-2011-7003737 (Dispatch No. 9-5-2012-0710438-46).
Office Action issued Jun. 30, 2014, in Chinese Patent Application No. 201180015025.3 (with English-language translation).
Office Action issued Jul. 14, 2014, in Korean Patent Application No. 10-2014-7008936 (with English-language translation).
Office Action issued Jul. 30, 2014, in Chinese Patent Application No. 201180015323.2 (with English-language translation).
Chinese Office Action dated Jul. 30, 2014, issued in Chinese Patent Application No. 201180015323.2.
Chinese Office Action dated Mar. 10, 2015, issued in Chinese Patent Application No. 201180015323.2.
Chinese Office Action dated Jun. 26, 2015, issued in Chinese Patent Application No. 201180015323.2.

(56) References Cited

OTHER PUBLICATIONS

Chinese Office Action dated Jan. 6, 2016, issued in Chinese Patent Application No. 201180015323.2.
Chinese Office Action dated Jun. 30, 2014, issued in Chinese Patent Application No. 201180015025.3.
Chinese Office Action dated Dec. 12, 2014, issued in Chinese Patent Application No. 201180015025.3.
Chinese Office Action dated Apr. 1, 2015, issued in Chinese Patent Application No. 201180015025.3.
Korean Office Action dated Apr. 27, 2012, issued in Korean Patent Application No. 10-2011-7003737.
Korean Office Action dated Nov. 23, 2012, issued in Korean Patent Application No. 10-2011-7003737.
Korean Office Action dated Aug. 6, 2013, issued in Korean Patent Application No. 10-2011-7003737 (with English translation).
Korean Office Action dated Sep. 25, 2014, issued in Korean Patent Application No. 10-2011-7003737.
Korean Office Action dated Jun. 11, 2012, issued in Korean Patent Application No. 10-2011-7007470.
Korean Office Action dated Dec. 26, 2012, issued in Korean Patent Application No. 10-2011-7007470.
Korean Office Action dated Apr. 3, 2013, issued in Korean Patent Application No. 10-2011-7007470.
Korean Office Action dated Apr. 26, 2013, issued in Korean Patent Application No. 10-2013-7001963 (with English translation).
Korean Office Action dated Oct. 29, 2013, issued in Korean Patent Application No. 10-2013-7001963 (with English translation).
Korean Office Action dated Jan. 6, 2014, issued in Korean Patent Application No. 10-2013-7001963.
Korean Office Action dated Mar. 3, 2015, issued in Korean Patent Application No. 10-2013-7011621.
International Search Report dated May 17, 2011, issued in PCT Application No. PCT/US2011/029235.
Korean Office Action dated Jul. 24, 2013, issued in Korean Patent Application No. 10-2013-7011623.
Korean Office Action dated Dec. 23, 2013, issued in Korean Patent Application No. 10-2013-7011623.
Korean Office Action dated Mar. 10, 2014, issued in Korean Patent Application No. 10-2013-7011623.
Korean Office Action dated Sep. 4, 2013, issued in Korean Patent Application No. 10-2013-7015827.
Korean Office Action dated Mar. 14, 2014, issued in Korean Patent Application No. 10-2013-7015827.
Korean Office Action dated May 15, 2014, issued in Korean Patent Application No. 10-2013-7015827.
Korean Office Action dated Jan. 23, 2014, issued in Korean Patent Application No. 10-2013-7028918.
Korean Office Action dated Jul. 16, 2014, issued in Korean Patent Application No. 10-2013-7028918.
Korean Office Action dated Sep. 17, 2014, issued in Korean Patent Application No. 10-2013-7028918.
Korean Office Action dated Feb. 7, 2014, issued in Korean Patent Application No. 10-2013-7031477.
Korean Office Action dated Aug. 28, 2014, issued in Korean Patent Application No. 10-2013-7031477.
Korean Office Action dated Nov. 3, 2014, issued in Korean Patent Application No. 10-2013-7031477.
Korean Office Action dated Jul. 14, 2014, issued in Korean Patent Application No. 10-2014-7008936.
Korean Office Action dated Jan. 6, 2015, issued in Korean Patent Application No. 10-2014-7008936.
Mexican Office Action dated Apr. 3, 2014, issued in Mexican Patent Application No. MX/a/2012/011281.
Mexican Office Action dated Dec. 17, 2014, issued in Mexican Patent Application No. MX/a/2012/011281.
Mexican Office Action dated Aug. 3, 2015, issued in Mexican Patent Application No. MX/a/2012/011281.
Mexican Office Action dated Jun. 7, 2013, issued in Mexican Patent Application No. MX/a/2012/010599.
Mexican Office Action dated Nov. 25, 2013, issued in Mexican Patent Application No. MX/a/2012/010599.

\* cited by examiner

```
<PDItable>
    <QBA>  ←------------- QUESTION EXPECTING BOOLEAN TYPE ANSWER, YES OR NO
        <id>111</id>
        <q>Are you currently employed?</q>
    </QBA>
    <QIA minInclusive="10" maxInclusive="100">  ←----- QUESTION EXPECTING VARIABLE INTEGER TYPE ANSWER
        <id>222</id>
        <q>What is the age of the oldest member of the household who watches television?</q>
    </QIA>
    <QSA minChoice="1" maxChoice="3">  ←----- QUESTION EXPECTING MULTIPLE SELECTION TYPE ANSWER
        <id>123</id>
        <q>In which of the following sports are you most interested? (Multiple selection allowed)</q>
        <a>Baseball</a>      ⎫
        <a>Basketball</a>    ⎬  ----- CANDIDATES FOR ANSWER
        <a>Soccer</a>        ⎪
        <a>Hockey</a>        ⎭
    </QSA>
    <QSA minChoice="1">  ←----------- QUESTION EXPECTING SINGLE SELECTION TYPE ANSWER
        <id>ProgramX:123</id>
        <q>Do you enjoy camping and outdoor recreation? (Only one selection)</q>
        <a>Never</a>         ⎫
        <a>Occasionally</a>  ⎬  ----- CANDIDATES FOR ANSWER
        <a>Frequently</a>    ⎭
    </QSA>
    <QTA>  ←----------- QUESTION EXPECTING VARIABLE TEXT TYPE ANSWER
        <id>321</id>
        <q>Do you have any idea to make ATSC2.0 services much more attractive?</q>
    </QTA>
</PDItable>
```

*FIG. 10*

```
<PDItable>
  <QBA>
    <id>111</id>  ------ ID
    <a>true</a>   ------ VALUE
  </QBA>
  <QIA>
    <id>222</id>
    <a>34</a>
  </QIA>
  <QSA>
    <id>123</id>  ------ ID
    <a>Baseball</a>  ⎫
    <a>Soccer</a>    ⎬ ----- VALUE
    <a>Hockey</a>    ⎭
  </QSA>
  <QSA>
    <id>ProgramX:123</id>
    <a>Occasionally</a>
  </QSA>
  <QTA>
    <id>321</id>
    <a>You should have an answer!</a>
  </QTA>
  <QAA>
    <id>Special:999</id>
    <a>g26Dj4Fbg2iCqo1Eggs=</a>
  </QAA>
</PDItable>
```

*FIG. 11*

INTERESTS AND DEMOGRAPHICS PROFILE FOR ADVANCED BROADCAST SERVICES

RELATED APPLICATIONS

This application claims priority to provisional patent application Ser. No. 61/319,873 filed Apr. 1, 2010.

TECHNICAL FIELD

Embodiments of the present invention relate to the field of communication systems, in particular profiles for advanced broadcast services.

BACKGROUND

Traditional media distribution systems such as broadcasting lack the ability to profile consumer preferences in order to provide customized media content. For example, such customized media content may include targeted advertising or marketing material of specific interest to the particular viewer.

Furthermore, viewers may not be interested in some media content. For example, some content is suitable for viewers living in a certain geographic area and not suitable for viewers living in a different area. Another example is that some viewers may be more interested in certain topic or genre areas such as sports broadcasting while others prefer programs of a different type, such as cooking shows.

Currently, there are no standards for allowing a viewer to customize their viewing preferences with respect to the content and services they receive. Current systems typically filter out program content based on viewer preference settings established in the receiver by the manufacturer of that receiver, with no input from the service provider as to the types of filtering criteria that might be suitable for the particular service. Furthermore, service providers do not have access to the viewer preference settings and thus are not able to directly tailor the user's experience of the service based on those settings.

BRIEF DESCRIPTION OF THE DRAWINGS

Embodiments of the present invention are illustrated by way of example, and not by way of limitation, in the figures of the accompanying drawings and in which.

DETAILED DESCRIPTION

Described herein is a digital broadcast receiver. The digital broadcast receiver has a storage device and a processing device. The storage device is configured to store a questionnaire received from at least one service provider of a digital broadcast system, and answers to the questionnaire. The processing device is configured to manipulate data received from the at least one service provider based on answers to the questionnaire. In one embodiment, the questionnaire includes a viewer preferences, demographics, and interests (PDI) container.

Figure 1:
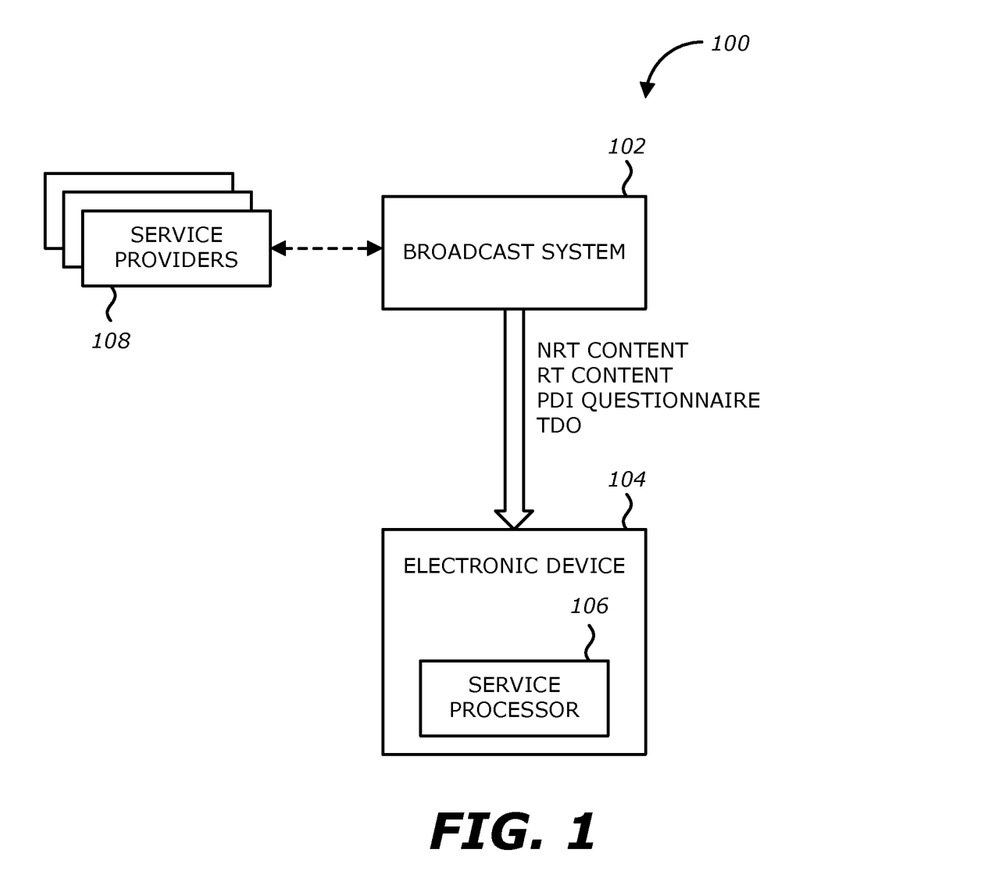
FIG. 1 is a block diagram illustrating one embodiment of a digital broadcasting system.

FIG. 1 is a block diagram illustrating one embodiment of a digital television service system 100. A broadcast system 102 receives content from service providers 108. Service providers 108 may include content distributors such as television network operators. Broadcast system 102 transmits content to an electronic device 104 such as a receiver over a wired and/or wireless medium (cable, satellite, over the air, Internet, or other forms of data transmission).

In one embodiment, the content broadcasted includes one or more of the following: non-real-time (NRT) content, real-time or linear content, metadata associated with content, a questionnaire, and triggered declarative objects (TDOs).

NRT content includes NRT services that are delivered faster or slower than real-time. In one embodiment, NRT content formats include audio/video but also can be audio-only or can be websites that can be displayed by a web browser. For example, descriptions of available NRT content can be described to the user. The user can select from a list of NRT content for later download. The user can also navigate and select from among previously downloaded content which to view.

Another NRT service features a "push" NRT service wherein the user is offered request-based content. The user may choose to have the receiver automatically update content associated with a service. For such chosen services, the receiver caches service-related content and automatically updates files as new versions are made available. When the user returns to a requested "push" service, content that has been preloaded is displayed.

Metadata associated with content describes the available content and services.

Figure 10:
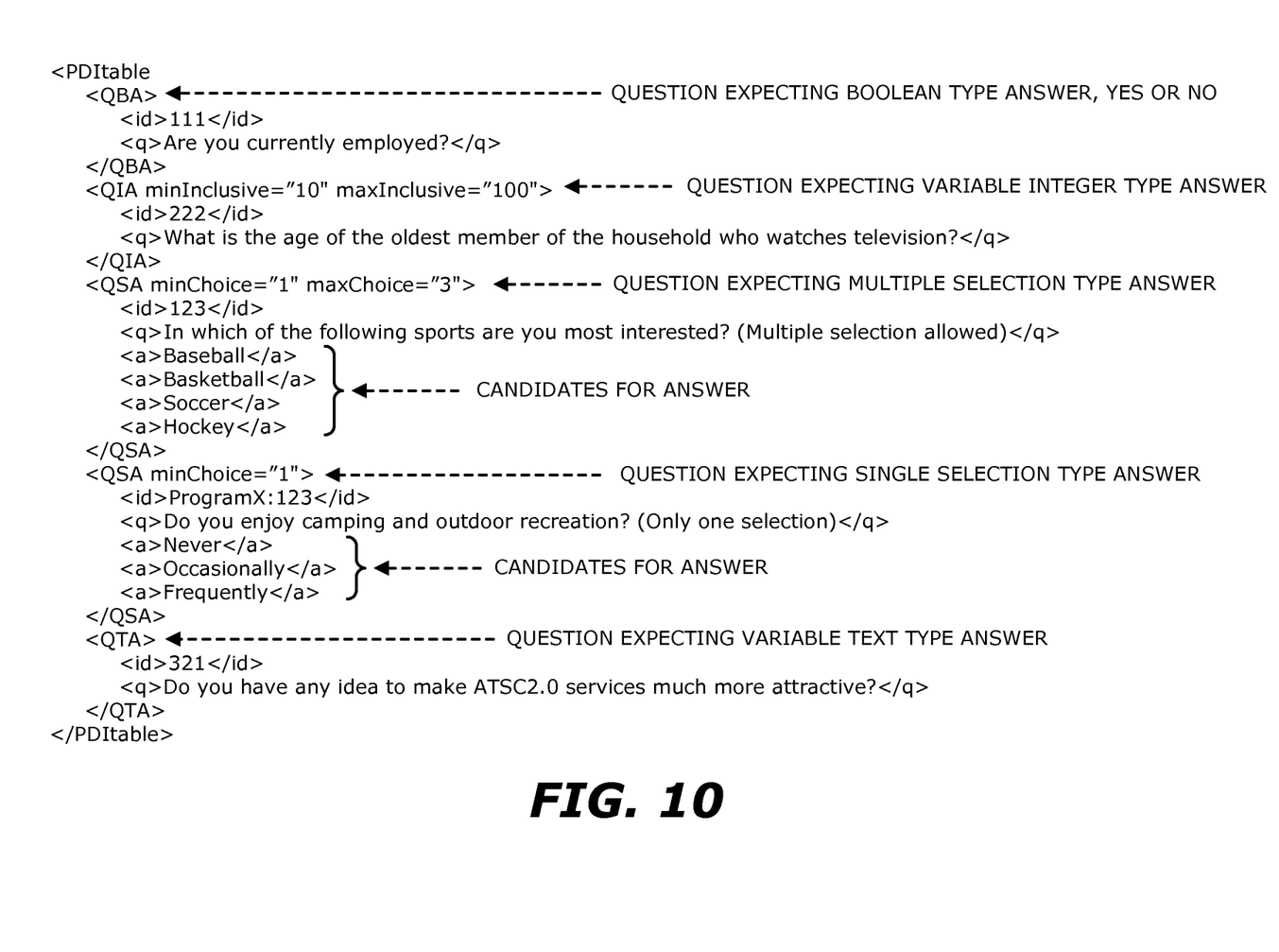
FIG. 10 is a diagram illustrating one embodiment of a data structure of PDI questions.

A questionnaire can allow users to specify various information about themselves that can allow the receiver to tailor advanced services based on the users' individual interests and preferences. In one embodiment, the questionnaire includes a data structure having a standardized format of preferences, demographics, and/or interests (PDIs) common to one or more service providers. For example, the format of the questionnaire would consist of questions, each with an answer in a predefined format. Possible answer formats could include yes/no or true/false, text string (with maximum length), multiple choice, integer (with range limits), checklist, among others. FIG. 10 illustrates an example of a format and data structure of an example PDI questionnaire.

TDOs are downloadable objects created by a content creator or service provider. In one embodiment, TDOs consist of declarative content (scripts, text, and graphics) whose function and behavior are tied in some way to the television programming they accompany. For example, a TDO may be designed to collect viewer response data such as voting on a game show or contest.

In one embodiment, electronic device 104 may be included in a set top box or as part of a display device such as a display panel (e.g. television). Electronic device 104 includes a signal processing device 106 configured to process content received from broadcast system 102 as further described below. In one embodiment, signal processing device 106 includes a processor capable of handling services broadcast according to Advanced Television Systems Committee (ATSC) standards.

Figure 2:
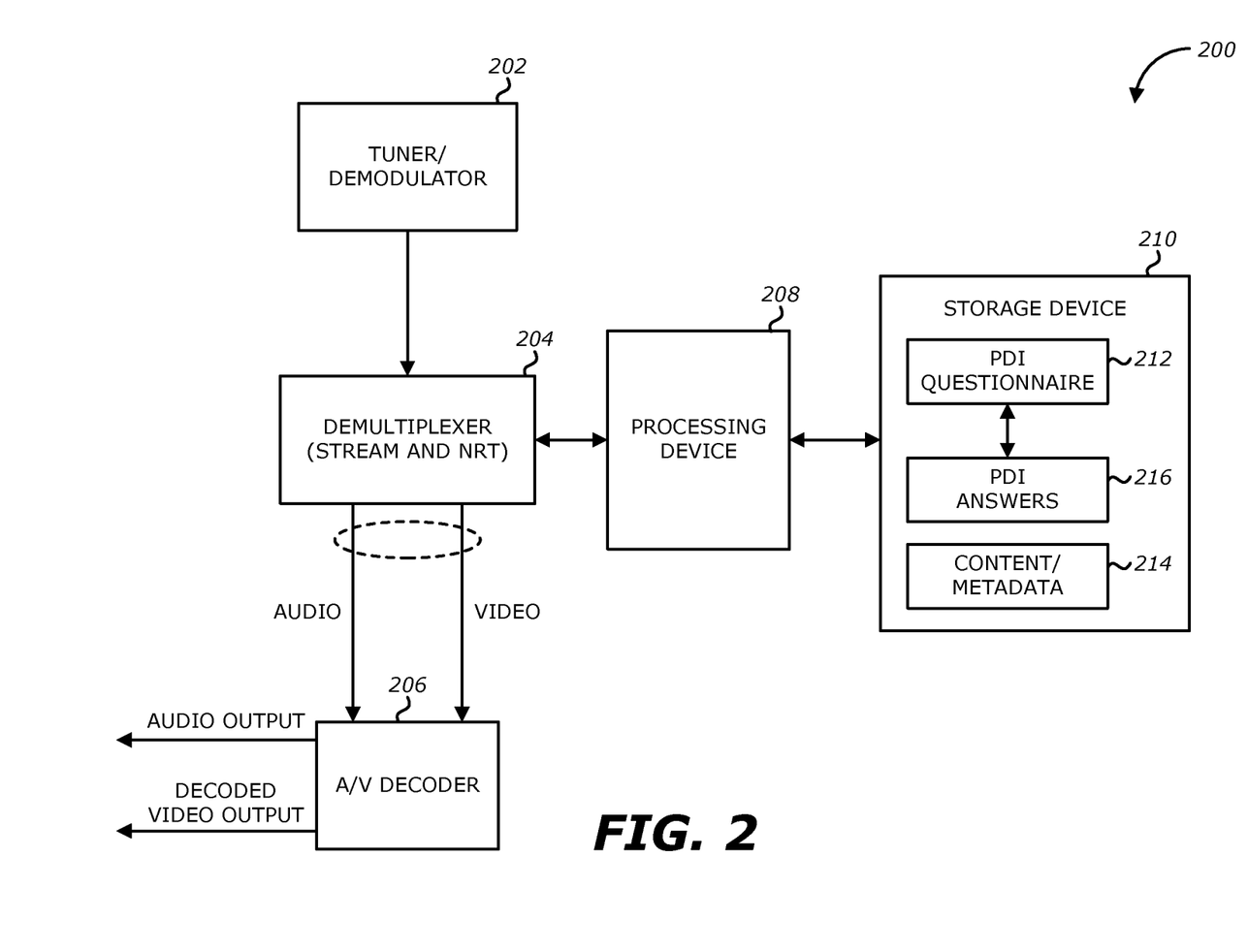
FIG. 2 is a block diagram illustrating one embodiment of a receiver.

FIG. 2 is a block diagram illustrating one embodiment of a digital broadcast receiver 200 designed to receive both real-time television broadcasts and NRT content. Receiver 200 includes a tuner/demodulator 202, a demultiplexer 204, an audio/video decoder 206, a processing device 208, and a storage device 210.

Tuner 202 receives a modulated RF input signal, tunes and demodulates the signal to produce an output transport stream. Demultiplexer 204 demultiplexes the stream to produce data to processing device 208. In the case of conventional real-time (linear) TV content, audio and video packets from tuner/demodulator 202 are supplied, via demultiplexer 204, to A/V decoder 206 for decoding. A/V decoder 206 supplies an audio output signal and a video output signal to a TV's audio and video circuit (not shown).

Content including audio/video, PDI questionnaires, NRT files, metadata, and TDOs received at demultiplexer 204 is routed via processing device 208 to storage device 210. In one embodiment, storage device 210 stores PDI questionnaire 212, answers to PDI questionnaire 216, and content and metadata 214. In one embodiment, PDI questionnaire 212 is a downloadable questionnaire generated by at least one service provider having a standardized data structure.

Storage device 210 may include a disc drive, a non-volatile memory, or any other types of data storage device. When a user instructs the system to play a selected item of NRT content, that content is then processed by processing device 208 and demultiplexed by demultiplexer 204 to provide audio and video packets to A/V decoder 206 to be eventually presented to the user.

Figure 3A:
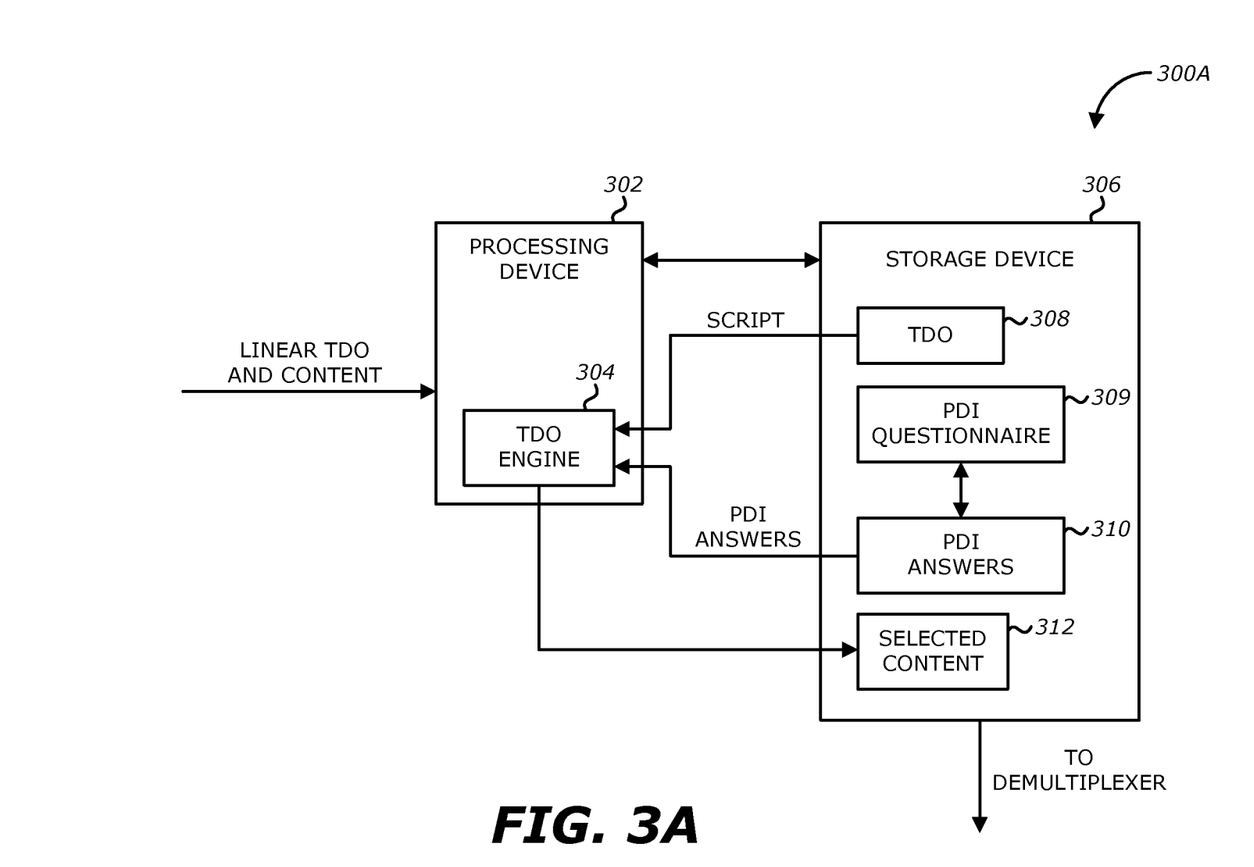
FIG. 3A is a block diagram illustrating one embodiment of a receiver receiving triggered declarative objects (TDOs).

FIG. 3A is a block diagram illustrating one embodiment of a receiver 300A receiving triggered declarative objects (TDOs). As previously discussed, TDOs are downloadable objects configured to interact with a user to enhance his/her viewing experience. A user may be notified that an enhanced (interactive) experience is being offered and accompanies a given program.

In one example, a user viewing a financial network program may be offered by a Stock Portfolio TDO to view his/her personalized stock when metadata associated with the financial network program indicates that screen space is available. The user may initialize the Stock Portfolio TDO with a list of stocks of interest.

In another example, a Favorite Driver Watch TDO is offered to a viewer watching a televised car race. The Favorite Driver Watch TDO enhances the viewer experience by displaying a thumbnail photo of the driver, his current speed, RPM, and position in the race. The Favorite Driver Watch TDO disappears from view during advertising spots and whenever racing is suspended or complete.

In yet another example, a Voting TDO can be used to capture viewer input while watching a talent contest. The Voting TDO is activated to allow a viewer to vote on a singer's performance.

TDO 308 (scripts and associated assets such as graphics, text, audio files, HTML, etc. . . . ) may be stored in storage device 306. Processing device 302 executes an operation of the TDO 308 with a TDO engine 304. For example, processing device 302 executes a script of Stock Portfolio TDO to display a list of stocks of interests to a viewer when the viewer is watching a financial program on a network with metadata indicating available screen space.

Storage device 306 also includes PDI questionnaire 309 and PDI answers 310. PDI answers 310 contain answers to the questionnaire in PDI questionnaire 309. The PDI questionnaire and answers may be in a standardized data structure format common to various service providers.

In one embodiment, TDO 308 access PDI answers 310 through an Application Programming Interface (API) and exhibits actions and behaviors conditionally based on responses recorded in PDI answers 310. A script in TDO 308 could, for example, create one user experience if the age of the oldest TV-watching member of the household is 35 or less and a different experience otherwise. Different user experiences can include display of different text or graphics, branching to different audio/video content, and including different choices in a list.

In another embodiment, selected content 312 from the TDO 308 in response to the answers of PDI answers 310 may be stored within storage device 306.

Figure 3B:
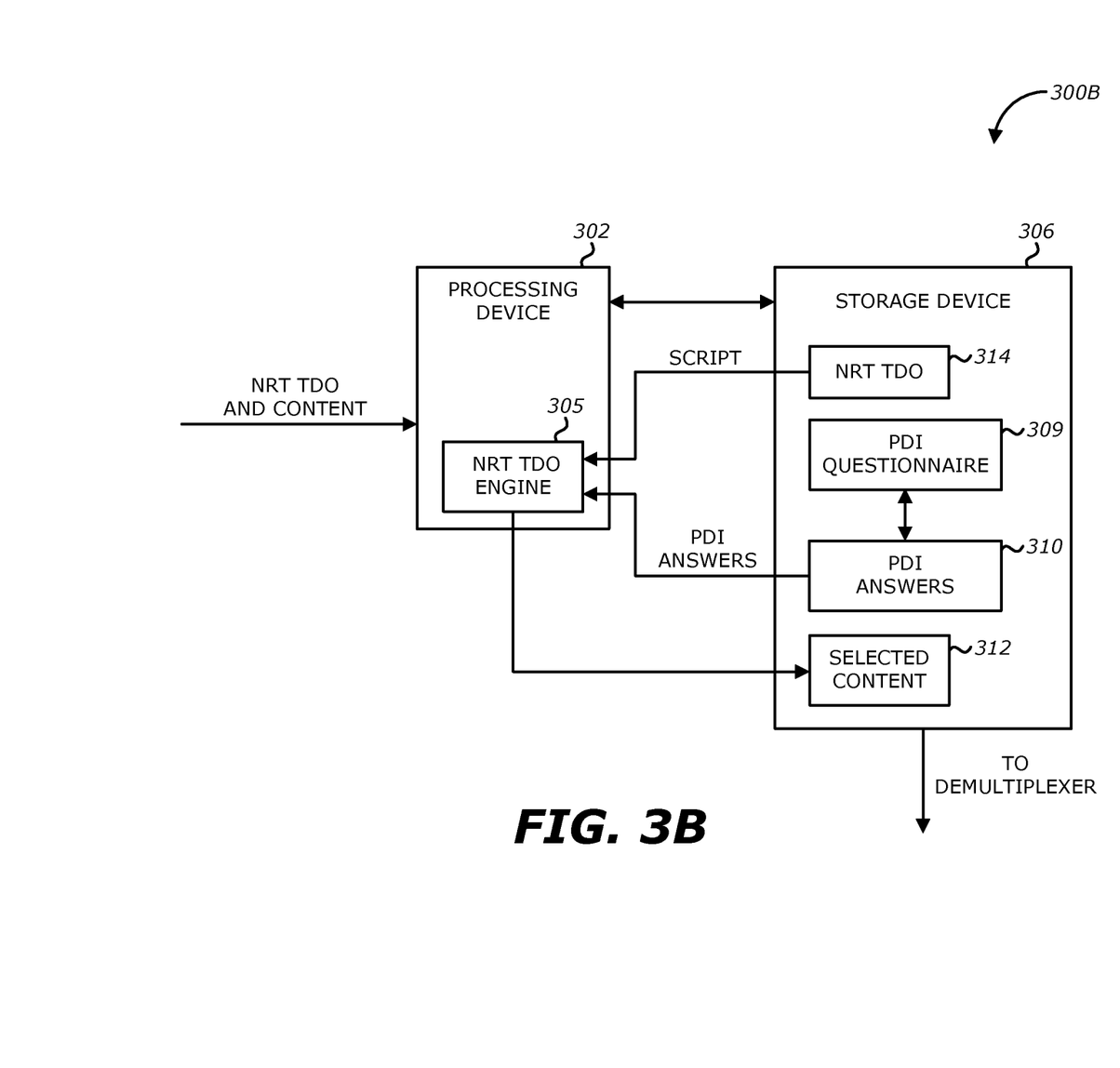
FIG. 3B is a block diagram illustrating one embodiment of a receiver receiving non-real time (NRT) triggered declarative objects (TDOs).

FIG. 3B is a block diagram illustrating one embodiment of a receiver 300B receiving non-real time (NRT) triggered declarative objects (TDOs). Similarly, processing device 302 executes a script from NRT TDO 314 with a NRT TDO engine 305. For example, NRT TDO 314 includes all the functionality of a regular TDO 308 and in addition may include references to NRT content and hyperlinks that, if taken, cause the receiver to set up a future download of an NRT content item, and/or hyperlinks that allow playback of previously downloaded content.

In one embodiment, the script in NRT TDO 314 accesses PDI questionnaire 309 and PDI answers 310 through an Application Programming Interface (API) and behaves based on PDI answers 310. For example, a script in a NRT TDO 314 could offer the viewer the choice to select and purchase a baseball game program for a particular team based the user's favorite team as specified in PDI answers 310.

Figure 4:
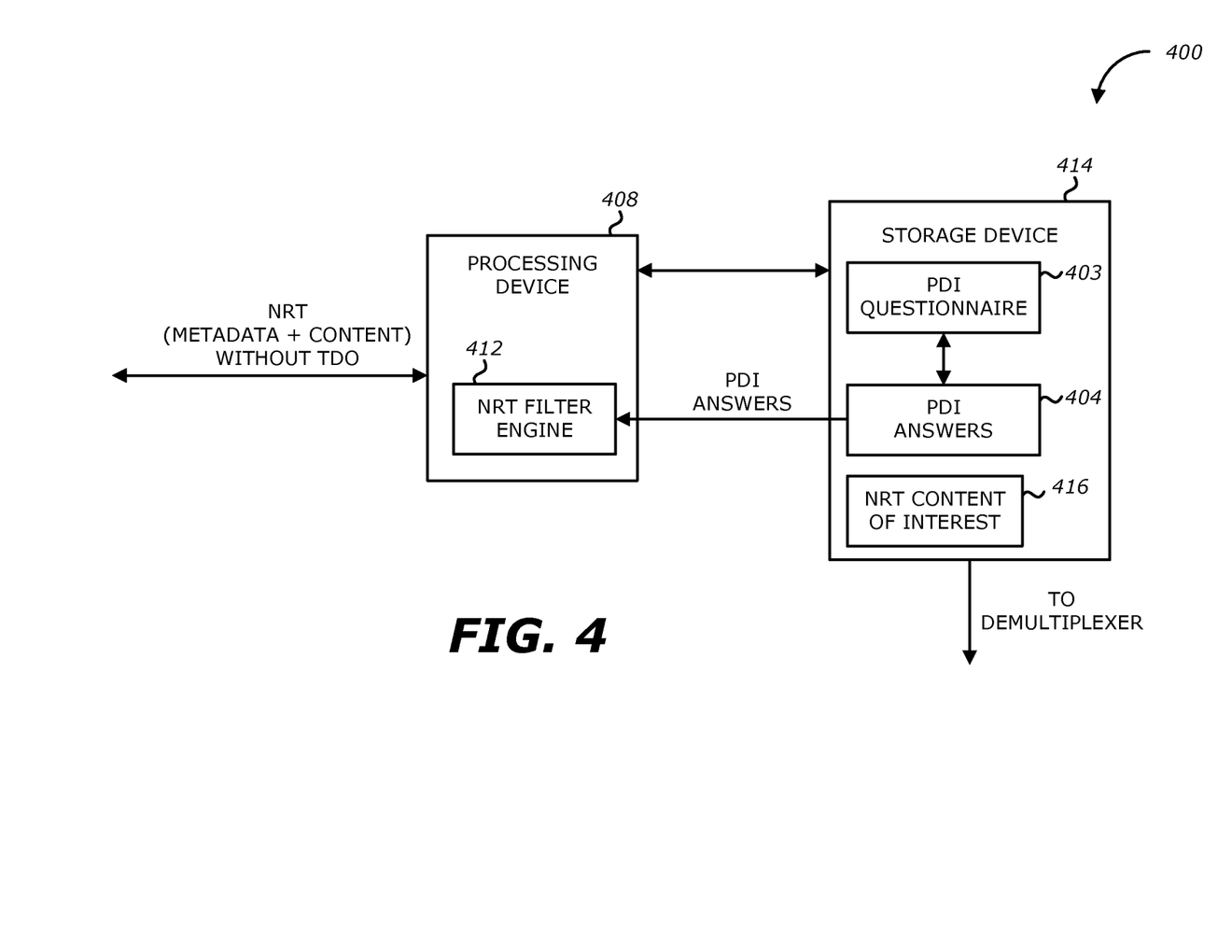
FIG. 4 is a block diagram illustrating one embodiment of a receiver receiving non-real time (NRT) content.

FIG. 4 is a block diagram illustrating one embodiment of a receiver 400 receiving non-real time (NRT) content. Processing device 408 filters content without use of TDOs according to PDI answers 404 to PDI questionnaire 403 with content filter/matching engine 412. For example, processing device 408 matches a local advertisement based on a geographic region of the viewer as specified in his/her PDI answers 404.

In one embodiment, processing device 408 filters and stores NRT content of interest 416 based on the interest of the viewer. For example, movie previews or trailers matching the preference (action, drama, comedy, etc. . . . ) of the viewer as set forth in PDI answers 404 are stored in storage device 414.

In another embodiment, processing device 408 filters and stores received NRT content using metadata associated with the NRT content.

Figure 5:
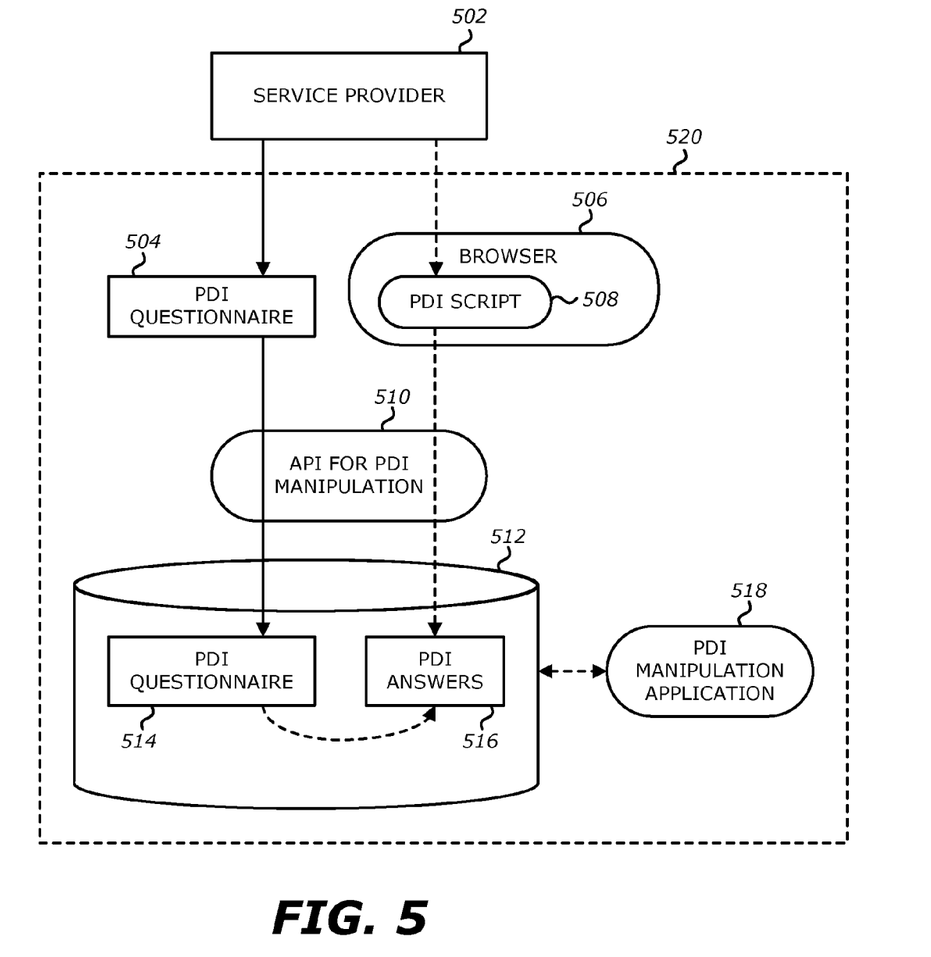
FIG. 5 is a block diagram illustrating one embodiment of a system for storing and manipulating a PDI questionnaire in a receiver.

FIG. 5 is a block diagram illustrating one embodiment of a system for storing and manipulating PDI questionnaires in a receiver. A service provider 502 generates a PDI questionnaire 504 that is transmitted to a receiver 520. An API for PDI manipulation 510 allows for receiver 520 to store the PDI questionnaire 504 in storage device 512. A user/viewer is able to generate, update, and delete PDI answers 516 to PDI questionnaire 514 via PDI manipulation application 518. In one example, PDI manipulation application 518 takes the form of a set up screen on a display device coupled to receiver 520.

In another embodiment, a web browser 506 of receiver 520 includes a PDI script 508 configured to write and generate PDI answers 516 to the PDI questionnaire 504.

Figure 6:
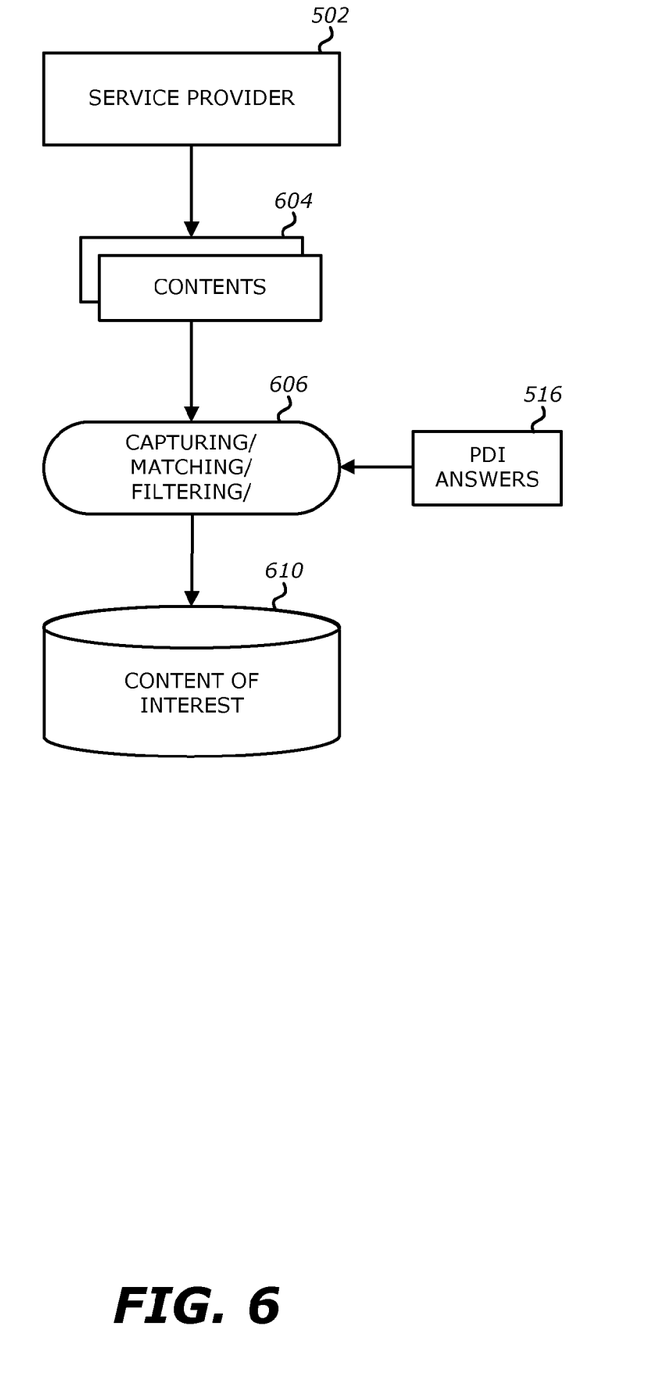
FIG. 6 is a flow diagram illustrating one embodiment of a system for filtering content based on answers to a PDI questionnaire in a receiver.

FIG. 6 is a block diagram illustrating one embodiment of a system for filtering content based on answers to a PDI questionnaire in a receiver. Service provider 502 distributes contents 604. Receiver 606 captures, matches, or filters contents 604 based on PDI answers 516. Content of interest 610 (e.g. content that matches the preferences of the viewer as specified in PDI answers 516) can be stored in storage device 512.

Figure 7:
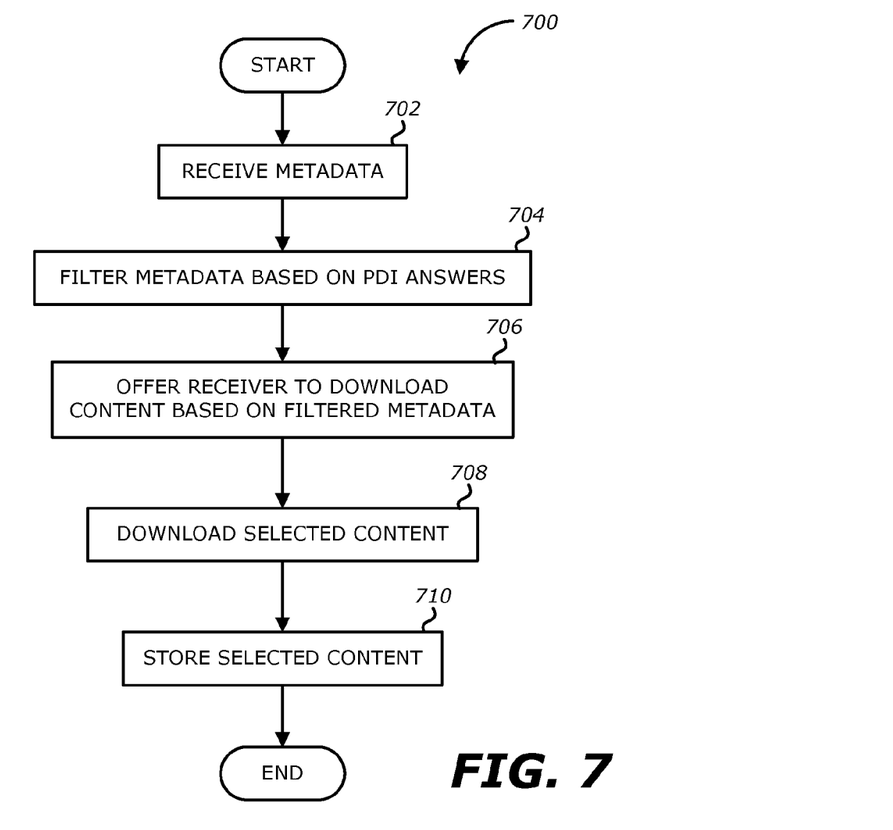
FIG. 7 is a flow diagram illustrating one embodiment of a method for downloading selected content at a receiver.

FIG. 7 is a flow diagram 700 illustrating one embodiment of a method for downloading selected content at a receiver. At 702, a receiver receives metadata descriptive of an associated content item. At 704, the receiver filters metadata based on PDI answers. At 706, the receiver offers the viewer the option to download content based on the matched PDI answers. For example, the receiver can filter or prioritize NRT content based on PDI responses. At 708, the viewer selects and downloads the selected content. In another embodiment, the selected content may be set to be downloaded at a future time (e.g. overnight). At 710, the selected content is stored in a storage device of the receiver.

Figure 8:
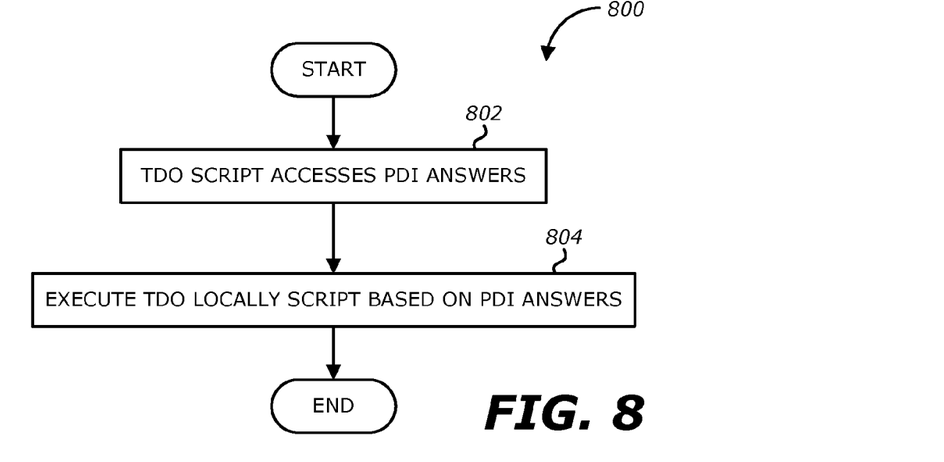
FIG. 8 is a flow diagram illustrating one embodiment of a method for executing a triggered declarative object (TDO) script based on answers to a PDI questionnaire in a receiver.

FIG. 8 is a flow diagram 800 illustrating one embodiment of a method for executing scripts in triggered declarative objects (TDOs) based on answers to a PDI questionnaire in a receiver. At 802, a TDO accesses PDI answers via an API. At 804, the processing device of the receiver executes the TDO script, which contains conditional branching or other logic to alter its behavior based on the PDI answers (e.g. displaying the telephone number of a local merchant on the screen).

Once downloaded and executed, TDOs access metadata and triggers to support their expected functionality and to time their behavior based on events within the program they accompany. Metadata for TDOs can be received in various ways (for example, via broadcast stream or the Internet). The receiver routes metadata to an active TDO.

Metadata and triggers drive TDO behavior in whatever way the author of the TDO intended. For example, metadata within a trigger can specify whether or not there is any available real estate on a screen at the current time, can cause a TDO to sleep or quit, and can initiate any desired action (including a change in appearance).

Figure 9:
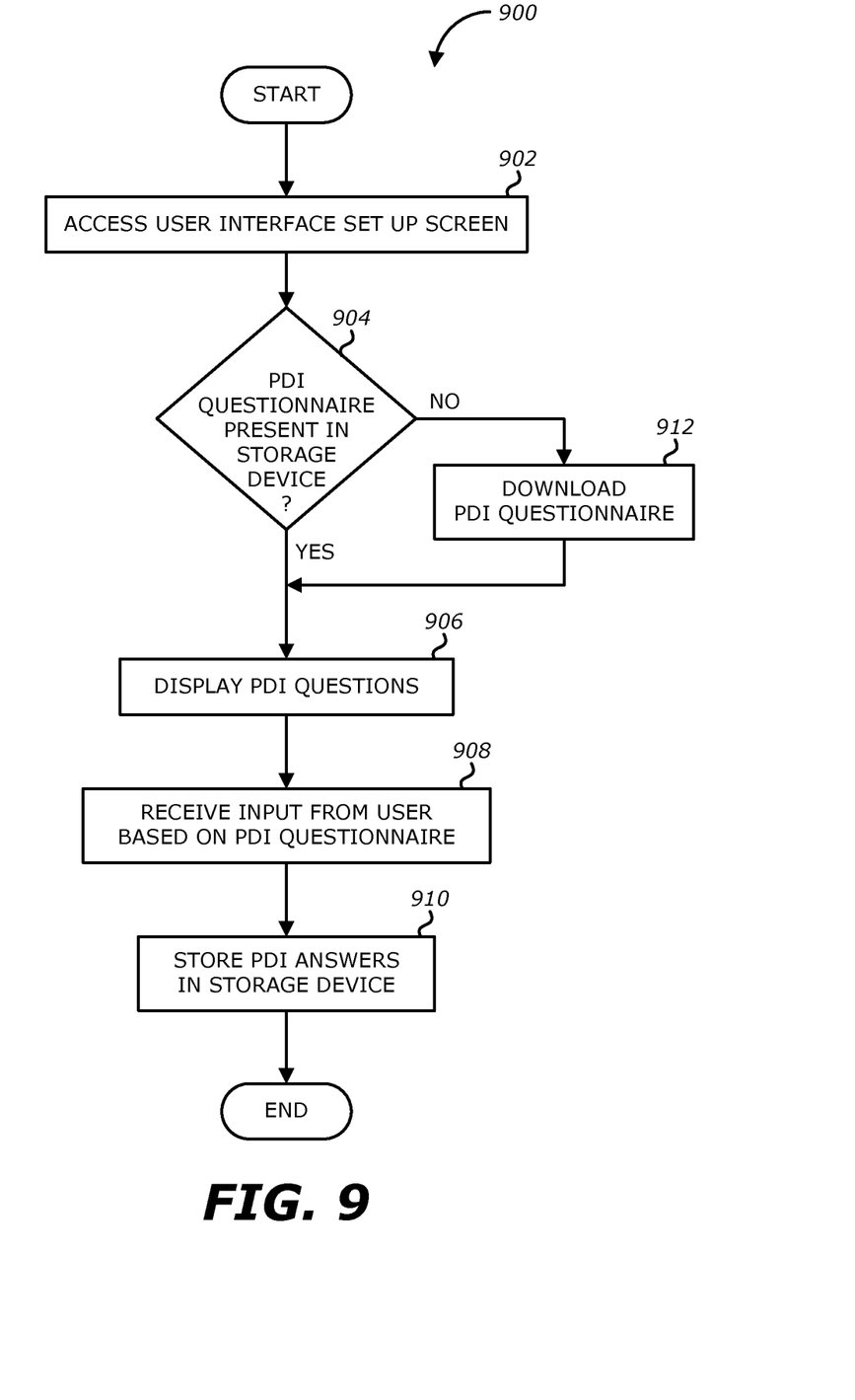
FIG. 9 is a flow diagram illustrating one embodiment of a method for receiving a PDI questionnaire and manipulating answers to the PDI questionnaire at a receiver.

FIG. 9 is a flow diagram 900 illustrating one embodiment of a method for receiving a PDI questionnaire and manipulating answers to the PDI questionnaire at a receiver. At 902, a user accesses a set-up or preference screen with a receiver. The receiver determines whether a PDI questionnaire is available at 904. If the receiver does not currently have a PDI questionnaire in storage, the receiver downloads at least one PDI questionnaire at 912.

At 906, PDI questions from the PDI questionnaire are displayed to the user. At 908, the user inputs answers in response to the PDI questions. At 910, the PDI answers are stored in a storage device of the receiver.

Figure 11:
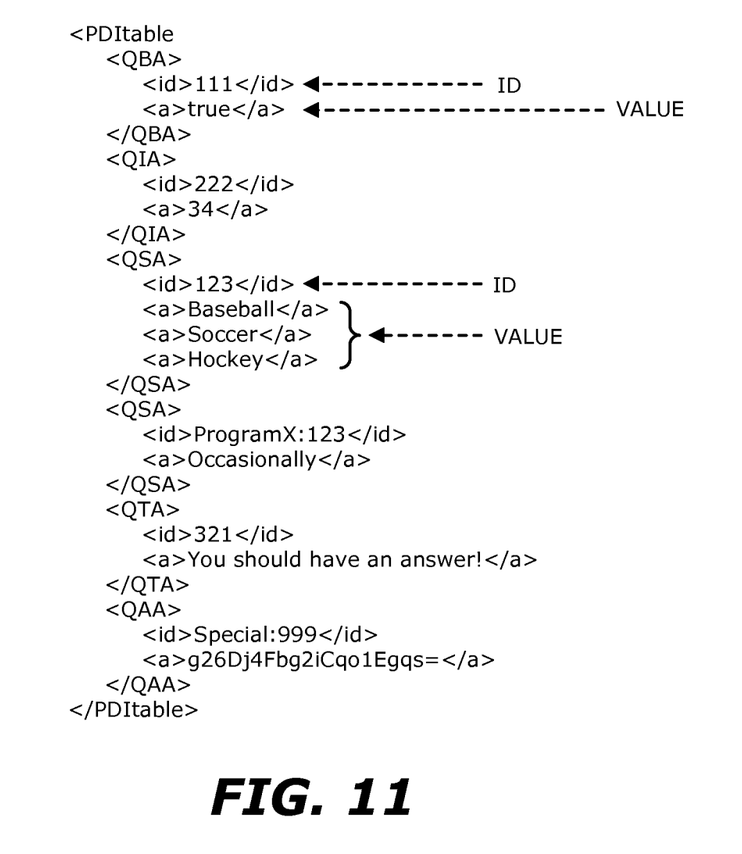
FIG. 11 is a diagram illustrating one embodiment of a data structure of PDI answers.

FIG. 10 is an illustration of an example of an XML format for representation of PDI questions. FIG. 11 is an illustration of an example of an XML format for PDI answers. As illustrated in FIGS. 10 and 11, standardization of preferences, demographics, and interests (PDIs) involve definition of a standard format for a downloadable questionnaire. The format of the questionnaire might consist of questions, each with an answer in a predefined format. Possible reply formats could include yes/no or true/false, text string (with maximum length), multiple choice, integer (with range limits), checklist, etc.

The multiple choice reply format would allow the user to select from among a fixed number of identified choices. As an example, a query string could be "How often do you enjoy camping outdoors?" The corresponding multiple choice answer might include the possibilities "Never," "Sometimes," "Occasionally," and "Regularly."

The checklist reply format allows a user to provide a yes/no response to a number of different small items. For example, the query string might be "Which of the following sports do you follow?" The checklist might include football, basketball, soccer, rugby, hockey and baseball. Each of the items in the checklist may be selected or not selected. As previously discussed, access by receiver applications and TDOs to the PDI answers are made available via an API.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "forming" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for a digital broadcast system, the method comprising:
   receiving and storing, by circuitry of a receiver, a plurality of questionnaires, each of the plurality of questionnaires being associated with, and broadcast over-the-air by, a different one of a plurality of service providers of the digital broadcast system, wherein each of the plurality of questionnaires comprises a data structure common to the plurality of service providers;
   acquiring answers to the plurality of questionnaires;
   storing the acquired answers to the plurality of questionnaires in a memory of the receiver;
   downloading a plurality of different triggered declarative objects (TDOs) associated with the plurality of service providers;
   executing one of the plurality of different TDOs; and
   interfacing, by the circuitry, a script in the one of the plurality of different TDOs with at least one of the answers to the plurality of questionnaires via an Application Programming Interface (API) implemented at the receiver, the API being configured to interface scripts in the plurality of different TDOs with the at least one of the answers to the plurality of questionnaires, each of the different TDOs being associated with a different one of the plurality of service providers, wherein
   the one of the plurality of the different TDOs includes the script which is configured to perform a function conditioned on the at least one of the answers to the plurality of questionnaires stored in the memory of the receiver.

2. The computer-implemented method of claim 1, wherein the plurality of questionnaires pertain to preferences, demographics, and interests (PDI) information.

3. The computer-implemented method of claim 2, wherein each of the plurality of questionnaires comprises a data structure defined as an XML schema that is common to the plurality of service providers.

4. The computer-implemented method of claim 1, further comprising:

receiving content from one of the plurality of service providers; and
filtering the content received from the one of the plurality of service providers based on an answer to one of the plurality of questionnaires, wherein
the content and the one of the plurality of questionnaires are broadcast in a digital television broadcast stream by the one of the plurality of service providers.

5. The computer-implemented method of claim 4, wherein the content includes non-real time (NRT) data.

6. The computer-implemented method of claim 1, further comprising:
   receiving metadata from one of the plurality of service providers;
   matching the metadata based on an answer to one of the plurality of questionnaires;
   offering content associated with the matched metadata;
   downloading a selected offered content associated with the matched metadata; and
   storing the downloaded content in the receiver.

7. The computer-implemented method of claim 1, further comprising:
   interfacing the one of the plurality of different TDOs with questions from at least one of the plurality of questionnaires and any answers to the at least one of the plurality of questionnaires via the API implemented at the receiver.

8. The computer-implemented method of claim 7, wherein the one of the plurality of different TDOs comprises the script and data associated with the script.

9. The computer-implemented method of claim 8, wherein the script comprises behaviors conditioned on the at least one of the answers to the plurality of questionnaires at the receiver.

10. The computer-implemented method of claim 8, wherein the one of the plurality of different TDOs comprises a non-real time (NRT) TDO.

11. The computer-implemented method of claim 1, further comprising:
    processing questions from at least one of the plurality of questionnaires; and
    editing the answers to the at least one of the plurality of questionnaires with a manipulation application at the receiver.

12. The computer-implemented method of claim 1, wherein each answer to a question included in the plurality of questionnaires is stored in association with a question identifier of the respective question.

13. The computer-implemented method of claim 1, wherein execution of the one of the plurality of different TDOs is synchronized with real-time content broadcast over-the-air.

14. The computer-implemented method of claim 1, wherein the step of downloading comprises:
    downloading, by the circuitry, the one of the plurality of different TDOs while a broadcast stream from one of the plurality of service providers is being decoded by the circuitry for display to a user.

15. A non-transitory computer-readable storage medium, having instructions stored therein, which when executed, cause a computer system to perform a method comprising:
    receiving and storing, at a receiver, a plurality of questionnaires, each of the plurality of questionnaires being associated with, and broadcast over-the-air by, a different one of a plurality of service providers of the digital broadcast system, wherein each of the plurality of questionnaires comprises a data structure common to the plurality of service providers;
acquiring answers to the plurality of questionnaires;
storing the answers to the plurality of questionnaires in a memory of the receiver;
downloading a plurality of different triggered declarative objects (TDOs) associated with the plurality of service providers;
executing one of the plurality of TDOS; and
interfacing a script in the one of the plurality of different TDOs with at least one of the answers to the plurality of questionnaires via an Application Programming Interface (API) implemented at the receiver, the API being configured to interface scripts in the plurality of different TDOs with the at least one of the answers to the plurality of questionnaires, each of the different TDOs being associated with a different one of the plurality of service providers, wherein
the one of the plurality of different TDOs includes the script which is configured to perform a function conditioned on the at least one of the answers to the plurality of questionnaires stored in the memory of the receiver.

16. The non-transitory computer-readable storage medium of claim 15, wherein the plurality of questionnaires pertain to preferences, demographics, and interests (PDI) information.

17. The non-transitory computer-readable storage medium of claim 16, wherein each of the plurality of questionnaires comprises a data structure defined as an XML schema common to the plurality of service providers.

18. The non-transitory computer-readable storage medium of claim 15, wherein the method further comprises:
receiving content from one of the plurality of service providers; and
filtering the content received from the one of the plurality of service providers based on an answer to one of the plurality of questionnaires, wherein
the content and the one of the plurality of questionnaires are broadcast in a digital television broadcast stream by the one of the plurality of service providers.

19. The non-transitory computer-readable storage medium of claim 18, wherein the content includes non-real time (NRT) data.

20. The non-transitory computer-readable storage medium of claim 15, wherein the method further comprises:
receiving metadata from one of the plurality of service providers;
matching the metadata based on an answer to one of the plurality of questionnaires;
offering content associated with the matched metadata;
downloading a selected offered content associated with the matched metadata; and
storing the downloaded content in the receiver.

21. The non-transitory computer-readable storage medium of claim 15, wherein the method further comprises:
interfacing the one of the plurality of different TDOs with questions from at least one of the plurality of questionnaires and the answers to the at least one of the plurality of questionnaires via the API implemented at the receiver.

22. The non-transitory computer-readable storage medium of claim 21, wherein the one of the plurality of different TDOs comprises the script and data associated with the script.

23. The non-transitory computer-readable storage medium of claim 22, wherein the script comprises behaviors conditioned on the at least one of the answers to the plurality of questionnaires at the receiver.

24. The non-transitory computer-readable storage medium of claim 21, wherein the one of the plurality of different TDOs comprises a non-real time (NRT) TDO.

25. The non-transitory computer-readable storage medium of claim 15, wherein the method further comprises:
processing questions from at least one of the plurality of questionnaires; and
editing the answers to the at least one of the plurality of questionnaires with a manipulation application at the receiver.

26. A digital broadcast receiver, comprising:
a non-transitory computer-readable medium configured to store a plurality of questionnaires, each of the plurality of questionnaires being associated with, and broadcast over-the-air by, a different one of a plurality of service providers of a digital broadcast system and each of the plurality of questionnaires comprising a data structure common to the plurality of service providers, and to store answers to the plurality of questionnaires; and
circuitry coupled to the non-transitory computer-readable medium and configured
to download a plurality of different triggered declarative objects (TDOs) associated with the plurality of service providers;
to execute one of the plurality of different TDOs; and
to interface a script of the one of the plurality of different TDOs with at least one of the answers to the plurality of questionnaires via an Application Programming Interface (API) implemented at the receiver, the API being configured to interface the plurality of different TDOs with the at least one of the answers to the plurality of questionnaires, each of the different TDOs being associated with a different one of the plurality of service providers, wherein
the one of the plurality of TDOs includes the script which is configured to perform a function conditioned on the at least one of the answers to the plurality of questionnaires stored in the memory of the receiver.

27. The digital broadcast receiver of claim 26, wherein the plurality of questionnaires pertain to preferences, demographics, and interests (PDI) information.

28. The digital broadcast receiver of claim 27, wherein each of the plurality of questionnaires comprises a data structure defined as an XML schema common to the plurality of service providers.

29. The digital broadcast receiver of claim 26, wherein the circuitry is further configured
to receive content from one of the plurality of service providers, and
to filter the content received from the one of the plurality of service providers based on an answer to one of the plurality of questionnaires, wherein
the content and the one of the plurality of questionnaires are broadcast in a digital television broadcast stream by the one of the plurality of service providers.

30. The digital broadcast receiver of claim 29, wherein the content includes non-real time (NRT) data.

31. The digital broadcast receiver of claim 26, wherein the circuitry is further configured
to receive metadata from one of the plurality of service providers,
to match the metadata based on an answer to one of the plurality of questionnaires, to offer content associated with the matched metadata,
to download a selected offered content associated with the matched metadata, and
to store the downloaded content in the receiver.

32. The digital broadcast receiver of claim 26, wherein the circuitry is further configured
to interface the one of the plurality of different TDOs with questions from at least one of the plurality of questionnaires and the answers to the at least one of the plurality of questionnaires via the API implemented at the receiver.

33. The digital broadcast receiver of claim 32, wherein the one of the plurality of different TDOs comprises the script and data associated with the script.

34. The digital broadcast receiver of claim 33, wherein the script comprises behaviors conditioned on the at least one of the answers to the plurality of questionnaires at the receiver.

35. The digital broadcast receiver of claim 33, wherein the one of the plurality of different TDOs comprises a non-real time (NRT) TDO.

36. The digital broadcast receiver of claim 26 wherein the circuitry is further configured
to process questions from at least one of the plurality of questionnaires, and
to edit the answers to the at least one of the plurality of questionnaires with a manipulation application at the receiver.

* * * * *